No. 682,018. Patented Sept. 3, 1901.
F. H. ALLEN.
MEAT TENDERER.
(Application filed May 6, 1901.)
(No Model.)
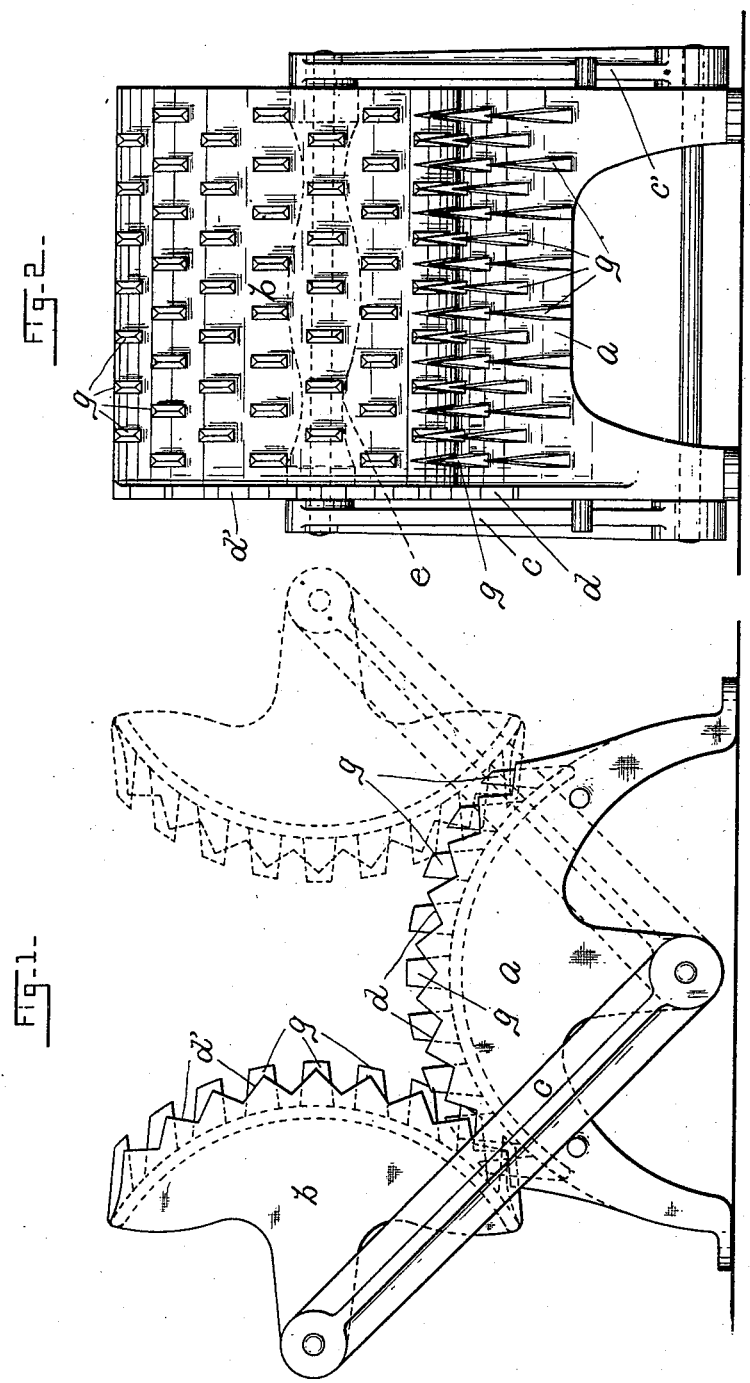
WITNESSES, INVENTOR,
Frank H. Allen
THE NORRIS PETERS CO., PHOTO-LITHO., WASHINGTON, D. C.

UNITED STATES PATENT OFFICE.

FRANK H. ALLEN, OF NORWICH, CONNECTICUT.

MEAT-TENDERER.

SPECIFICATION forming part of Letters Patent No. 682,018, dated September 3, 1901.

Application filed May 6, 1901. Serial No. 58,880. (No model.)

*To all whom it may concern:*

Be it known that I, FRANK H. ALLEN, a citizen of the United States, residing at Norwich, in the county of New London and State of Connecticut, have invented certain new and useful Improvements in Meat-Tenderers, of which the following is a full, clear, and exact description.

The chief aim of this invention is to provide a cheap, strong, and effective device for rendering sliced meats, such as beefsteaks, tender and more easily and completely cooked than has been possible heretofore.

Briefly described, the said invention consists of two sector-shaped plates, one adapted to rock upon the other substantially like two gear-segments, the confronting faces of said sectors being formed with radially-projecting teeth that enter the meat from opposite sides when the latter is passed between the said sectors. This results in perforating and slitting the meat in a great number of places and in cutting and macerating its normally tough fibers. It also lays open both faces of said meat in such manner that it is the more readily and completely acted upon by the fire in the operation of broiling or frying.

The drawings annexed hereto illustrate my newly-improved meat-tenderer, Figure 1 being an end elevation, and Fig. 2 a front side elevation, of the same.

In the drawings, the letter *a* indicates the lower or fixed sector, and *b* the upper or rocking sector, the said sectors being held in operative relation to each other by connecting-rods *c c'* and also by meshing teeth *d d'*, that are located at one side only of the sectors, as seen in the drawings. The connecting-rods *c c'* are hinged to the sectors at the centers of the radii of said sectors, and between the upper ends of the sector *b* is a handle *e*, by means of which the said sector *b* may be conveniently and forcibly rocked upon the fixed secter. The confronting faces of both sectors are formed with projecting spurs *g*, these spurs being "staggered" or offset, so that the spurs of one sector enter the spaces between the spurs of the other sector. The spurs *g* are of such length that they extend nearly, but not quite, to the confronting face of the opposite sector, and it will now be understood that if a slice of meat be entered between the sectors and the movable sector rocked forward and backward—that is to say, from the position in full lines to the position in dotted lines in Fig. 1 and back again to the starting-point—the meat will be punctured, slitted, and macerated on both its upper and lower sides by the described spurs *g*.

It should be particularly noted that in a meat-tenderer of this description only a small part of the meat is being punctured and slitted at any one time, so that only a limited amount of power is required to accomplish the desired end. It should also be noted that the meat may be stripped from the spurs *g* after having been operated upon once and may be repeatedly introduced into the tendering device in different positions, thus making it possible to thoroughly macerate the meat and cut its fibers into short sections.

Having thus described my invention, I claim—

1. A meat-tenderer comprising, in combination, two confronting sector-shaped plates one of which is fixed and each provided with spurs substantially as set forth, and means for connecting said sectors whereby one sector may be rocked upon the other sector.

2. In combination, in a meat-tenderer, two confronting sector-shaped plates one of which is fixed and the other of which is carried by a pivotal support, each formed with projecting spurs as set forth, rods *c c'* connecting the said sectors, and means for maintaining the spurs of one sector in meshing relation to the spurs of the companion sector.

3. In combination, in a meat-tenderer, two confronting sector-shaped plates, one of which is fixed and each plate being provided with projecting spurs, means connecting said sectors, a pivotal support for the movable sector whereby it may be rocked upon the companion sector, and means, consisting of handle *e*, whereby the movable sector may be grasped and rocked.

4. In combination, in a meat-tenderer, two confronting sector-shaped plates, one of which is fixed and each formed with projecting spurs as set forth, rods $c\ c'$ connecting the said sectors, gears $d\ d'$ whereby the said sectors are kept in operative relation to each other, arms pivoted beneath the acting face of the fixed sector and pivotally connected with the movable sector and an operating-handle $e$ secured to the movable sector.

Signed at Norwich, Connecticut, this 4th day of May, 1901.

FRANK H. ALLEN.

Witnesses:
ALONZO M. LUTHER,
MAY F. RITCHIE.